(12) United States Patent
Riahi et al.

(10) Patent No.: US 7,784,677 B2
(45) Date of Patent: Aug. 31, 2010

(54) APPARATUS FOR REDUCING ENERGY CONSUMPTION WITHIN AN UNOCCUPIED ROOM

(75) Inventors: Thierry Riahi, Sarasota, FL (US); Lawrence Egle, Sarasota, FL (US); Aaron Dickey, Sarasota, FL (US)

(73) Assignee: Smart Light Tech, LLC, Miami, FL (US)

( * ) Notice: Subject to any disclaimer, the term of this patent is extended or adjusted under 35 U.S.C. 154(b) by 61 days.

(21) Appl. No.: 11/863,546

(22) Filed: Sep. 28, 2007

(65) Prior Publication Data

US 2008/0223924 A1 Sep. 18, 2008

Related U.S. Application Data

(60) Provisional application No. 60/847,732, filed on Sep. 28, 2006.

(51) Int. Cl.
*G06F 17/00* (2006.01)

(52) U.S. Cl. .................. 235/375; 235/380; 340/5.23

(58) Field of Classification Search .................. 235/380
See application file for complete search history.

(56) References Cited

U.S. PATENT DOCUMENTS

| | | | |
|---|---|---|---|
| 4,223,301 A | 9/1980 | Grimes et al. | |
| 5,933,085 A * | 8/1999 | Holcomb et al. | 340/5.66 |
| 6,700,224 B2 | 3/2004 | Biskup, Sr. et al. | |
| 6,710,553 B2 | 3/2004 | Logan | |
| 6,832,072 B2 | 12/2004 | Buckingham et al. | |
| 2001/0011765 A1 | 8/2001 | Arruti | |
| 2003/0036822 A1 * | 2/2003 | Davis et al. | 700/295 |
| 2003/0087678 A1 * | 5/2003 | Smith et al. | 455/574 |
| 2004/0059815 A1 | 3/2004 | Buckingham et al. | |
| 2004/0178889 A1 * | 9/2004 | Buckingham et al. | 340/328 |
| 2005/0095984 A1 | 5/2005 | Buckingham et al. | |
| 2005/0210283 A1 | 9/2005 | Kato | |

* cited by examiner

*Primary Examiner*—Michael G Lee
*Assistant Examiner*—Tabitha Chedekel
(74) *Attorney, Agent, or Firm*—C. Douglas McDonald; William Giltinan

(57) ABSTRACT

An apparatus for managing energy consumption in an unoccupied room having a keycard actuated card and a plurality of appliance control units interposed between electrical appliances and their power sources such that the card reader wirelessly transmits signals to the appliance control units upon insertion and removal of the keycard and the appliance control units energize the appliances only when the keycard is present in the card reader.

19 Claims, 15 Drawing Sheets

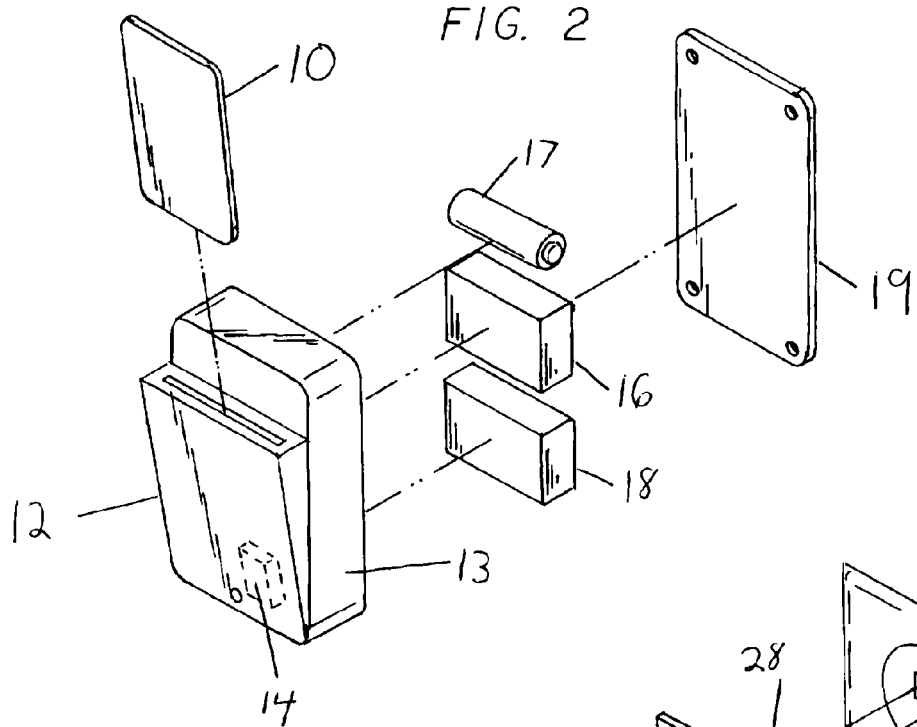
FIG. 2
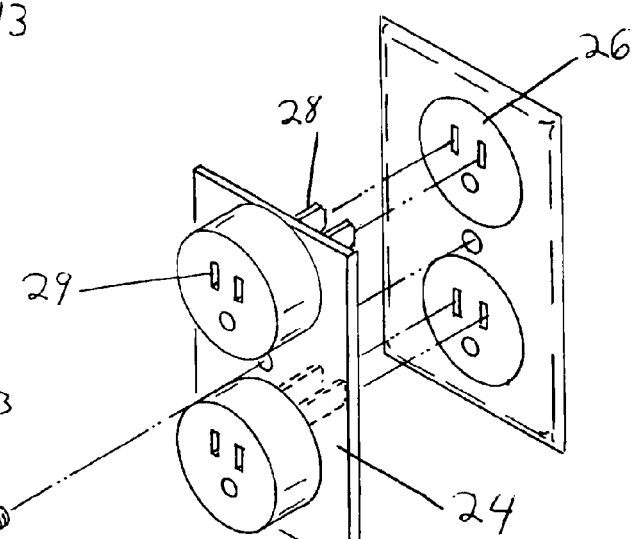
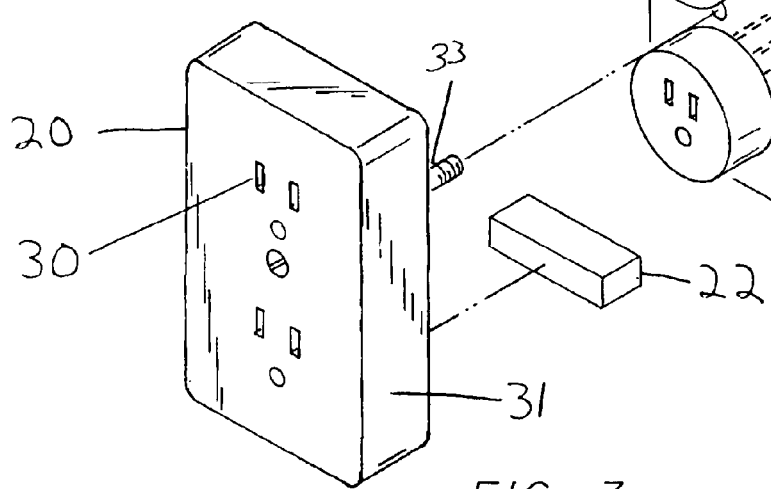
FIG. 3

APPARATUS FOR REDUCING ENERGY CONSUMPTION WITHIN AN UNOCCUPIED ROOM

BACKGROUND OF THE INVENTION

The present invention relates to a system for energy conservation in residential facilities, with particular application to hotel rooms.

In residential facilities, and especially hotel and motel rooms, conservation of electrical energy is an important element of controlling the cost of operating the facility. While it is desirable to have all electrical amenities, including lights, entertainment facilities and air conditioning, fully operational when a guest is present in the room, it is also desirable to reduce that energy consumption whenever the room is vacant, even when a guest is absent from the room for only a few hours. Accordingly, it is desirable to have an energy management system ("EMS") to control consumption of electrical energy in the room to reduce wasteful usage.

In some prior art systems in hotel rooms with modern wiring, the EMS may be integrated into the hotel security computer system that controls the use of card keys in the room door lock, so that actuation of the lock by the card key can energize the room, with timers or motion sensors further controlling the energization of the system. However, for existing facilities, extensive rewiring would be required to fully enable such a system.

Accordingly, it is an object of the present invention to provide an energy management system for residential facilities that can easily be retrofitted to existing rooms without significant requirements for rewiring the room.

SUMMARY OF THE INVENTION

According to the present invention, there is provided an energy management system for residential facilities comprising a card reader unit that is actuated by the insertion of a keycard and that provides for transmission of a signal to indicate the insertion of such a key. Further, there are provided secondary units for controlling appliances such as lamps, entertainment systems, heating and air conditioning units, and electrical outlets. The secondary units energize those appliances upon receipt of a first signal and de-energize those appliances upon the receipt of a second signal. The signals may conveniently be generated by a transmitter within the card reader or may conveniently be generated by a primary controller that receives signals from a transmitter within the card reader and then wirelessly relays the state of the card reader to the appliance control units.

BRIEF DESCRIPTION OF THE DRAWINGS

A preferred embodiment of the present invention will now be described by way of example, with reference to the accompanying drawings in which:

FIG. 2 is an exploded, perspective view of the card reader of the system of FIG. 1, illustrating insertion of a cardkey;

FIG. 3 is an exploded, perspective view of the secondary unit of one embodiment of the present invention adapted to engage wall socket;

DETAILED DESCRIPTION OF A PREFERRED EMBODIMENT

Figure 1:
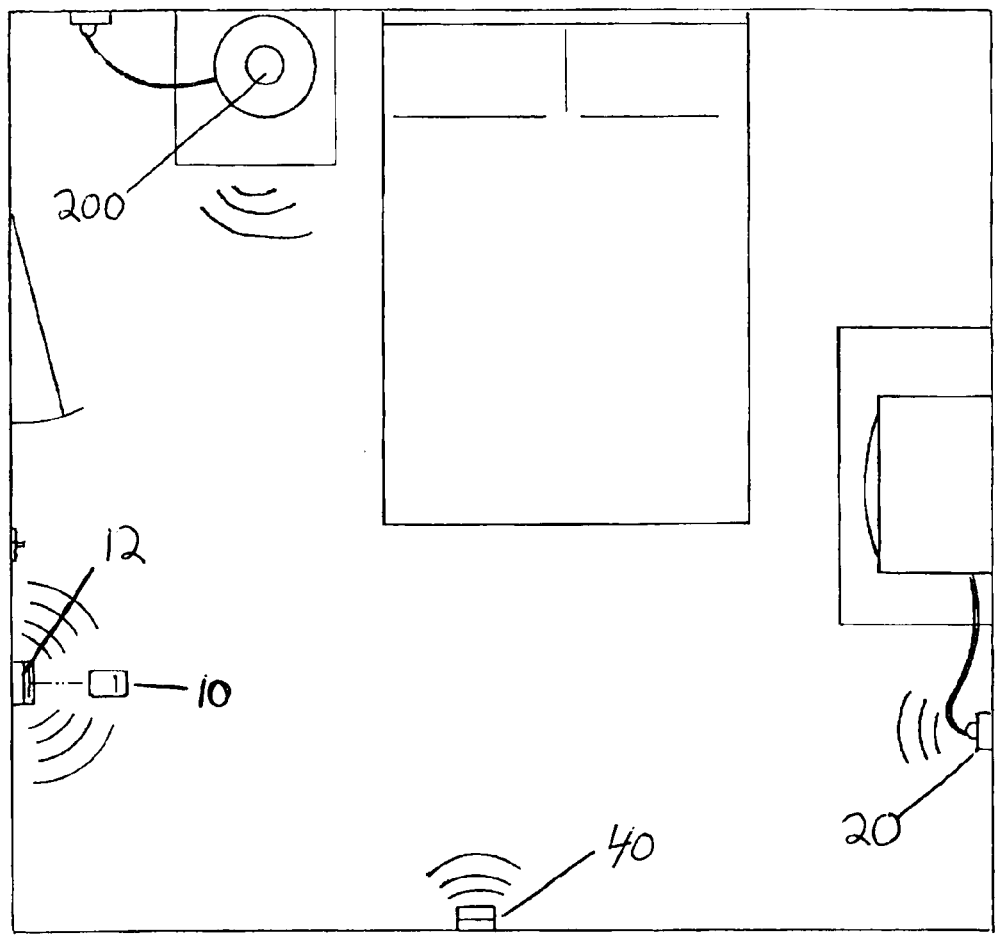
FIG. 1 is a plan view of a room in which a preferred embodiment of the energy management system of the present invention has been installed.

A preferred embodiment of the energy management system (EMS) of the present invention is illustrated in FIGS. 1 through 13. FIG. 1 is plan view of a typical hotel room showing keycard 10, card reader 12 inside the room, primary unit 40, and secondary units 20 and 200. FIG. 2 is an exploded, perspective view of a card reader 12, showing housing 13, switch 14, card reader transmitter 16, battery 17, card reader controller 18 electrically connected to card reader transmitter 16, battery 17, and switch 14, and backing plate 19. Keycard 10 may conveniently be a standard hotel room key, commonly fabricated out of plastic, and optionally including a magnetic strip containing data that may be read by an electronic door lock. Housing 13 and backing plate 19 may be conveniently formed from molded plastic or other suitable materials. Housing 13 includes a slot 11, configured, dimensioned and configured to receive keycard 10 and retain it until removed. Substantially upon insertion of keycard 10 into slot 11, keycard 10 engages and activates switch 14, which is electrically connected to card reader controller 18. Substantially upon removal, of keycard 10 from slot 11, keycard 10 disengages and deactivates switch 14. Switch 14 may conveniently be a commonly available, spring-activated switch. Alternatively, switch 14 may be an optical switch or may be comprised of a reader configured to read a magnetic strip on keycard 10 and to activate only upon validation of data read. Backing plate 19 may conveniently be configured to enable the card reader to be attached to wall.

Figure 6:
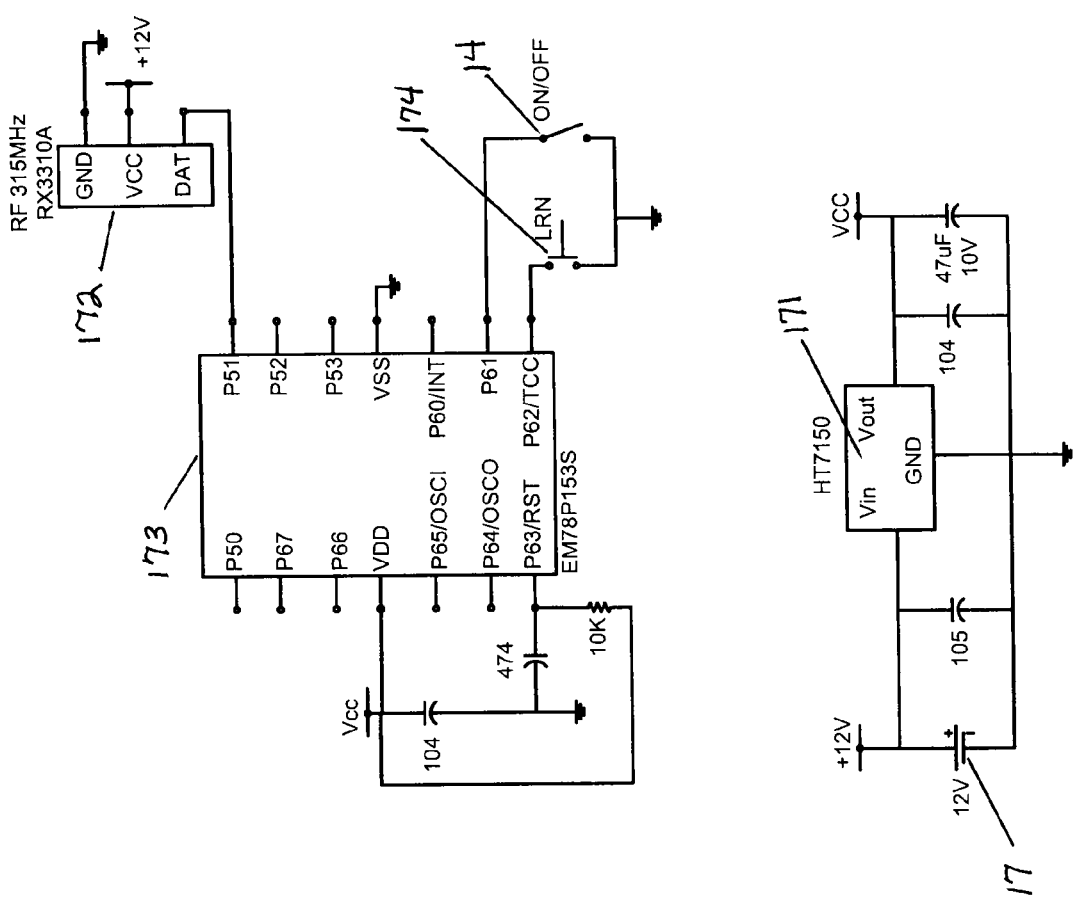
FIG. 6 is a schematic representation of a card reader for use in a preferred embodiment in the present invention.
Figure 8A:
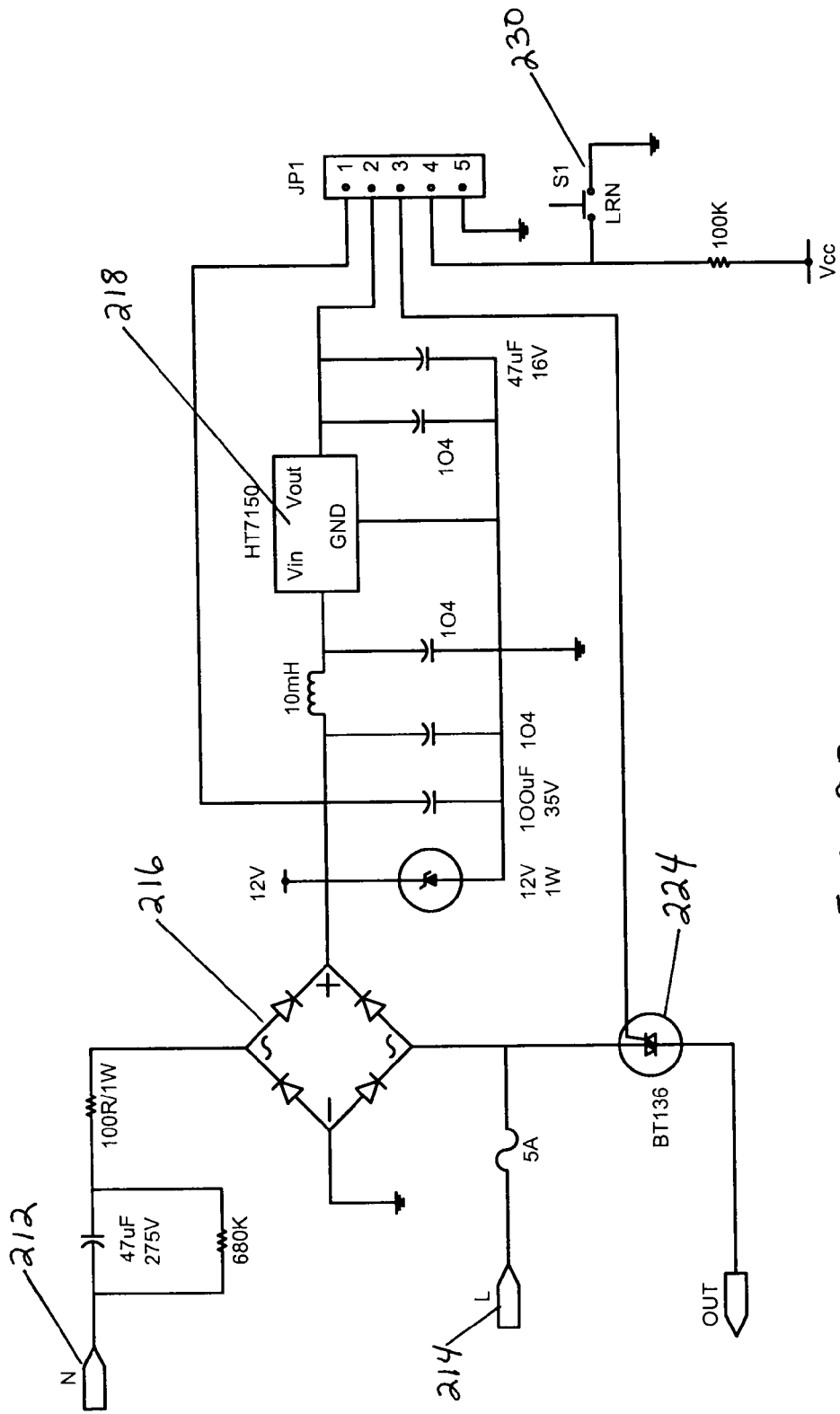
FIGS. 8A and 8B are a schematic representation of a secondary unit for use in a preferred embodiment of the present invention, in which the secondary unit is adapted to engage a bulb socket.
Figure 8B:
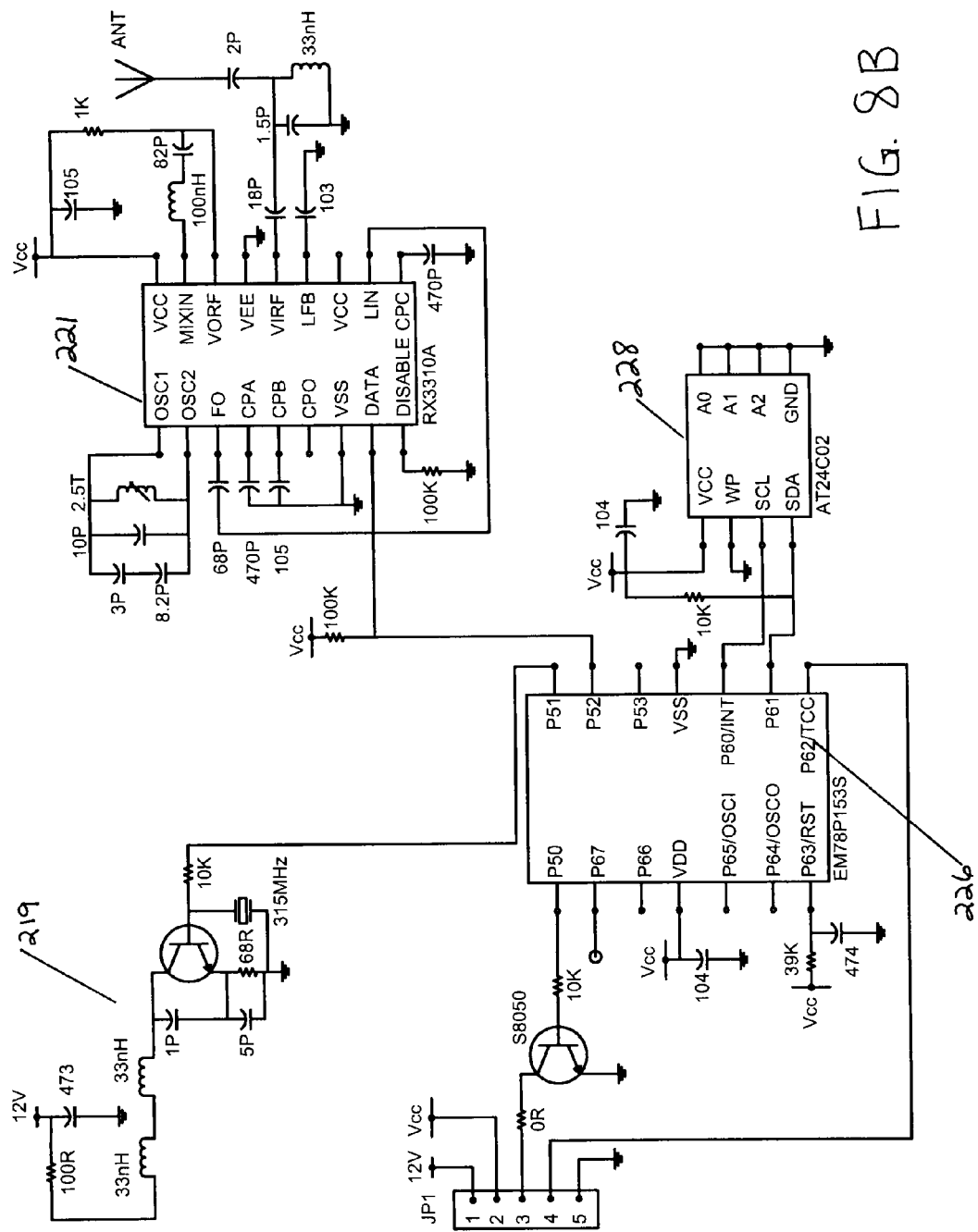

Battery 17 may conveniently be a standard 12 volt battery. Card reader controller 18 and battery-powered card reader transmitter 16 preferably comprise one or more electronic circuit boards with surface mount components. FIG. 6 illustrates a schematic representation of the components of one suitable configuration of card reader controller 18 and card reader transmitter 16. In FIG. 6, battery 17 powers voltage regulator 171, which may conveniently a standard HT7150 surface mount voltage regulator, and transmitter 172, which may conveniently be an amplitude shift keying (ASK) modulation transmitter that may conveniently be formed from discrete components as is illustrated in FIG. 8B or from a single onboard chip available from a wide variety of electronic component suppliers. Voltage regulator 171 provides suitable direct current to microcontroller 173, which may conveniently be an 8-bit microcontroller with on-chip memory such as the EM78P1535 from Elan Microelectronics. Microcontroller 173 is connected to switch 14, thereby enabling microcontroller 173 to determine whether keycard 10 is present in slot 11. Card reader controller 18 may also suitably comprise learn switch 174, further described below, which is also connected to microcontroller 173. Microcontroller 173 may also conveniently contain a unique value stored in its on-chip memory that may conveniently be used to distinguish a particular card reader 12 from other card readers 12 installed in adjacent rooms, as is further described below.

Upon activation of switch 14, microcontroller 173 causes card reader transmitter 16 to transmit a first signal, via ASK modulation, using techniques that are well understood in the art. The first signal may conveniently comprise the unique value stored in microcontroller 173, and a command code instructing secondary units 20, 200 to activate attached appliances. Upon deactivation of switch 14, microcontroller 173 causes card reader transmitter 16 to transmit a second signal instructing secondary units 20, 200 to deactivate attached appliances. The program in microcontroller 173 may conveniently be configured to transmit signals according to the algorithms illustrated in FIGS. 10-13 and further described below.

To avoid secondary units in adjacent rooms from being activated and deactivated by card reader controllers 18 and transmitters 16 in adjacent rooms, secondary units 20 and 200, optional primary unit 40, and secondary units configured to act as primary controllers 40a and 400a are configured to respond only to signals comprising a unique value. Upon activation of learn switch 174, microcontroller 173 causes that unique value to be transmitted by card reader transmitter 16 together with a command code indicating that all primary units 40, 40a, 400a and secondary units 20, 200 in range should henceforth respond only to signals comprising that unique value. Primary units 40, 40a, and 400a and secondary units 20, 200 may further comprise secondary learn switches configured such that each unit will accept the command code only if received subsequent to the activation of the secondary learn switches. Other techniques well known in the art may also be used for this purpose, including configuring card reader transmitters, primary transceivers, and secondary transceivers in adjacent rooms to communicate using different frequencies.

Figure 4:
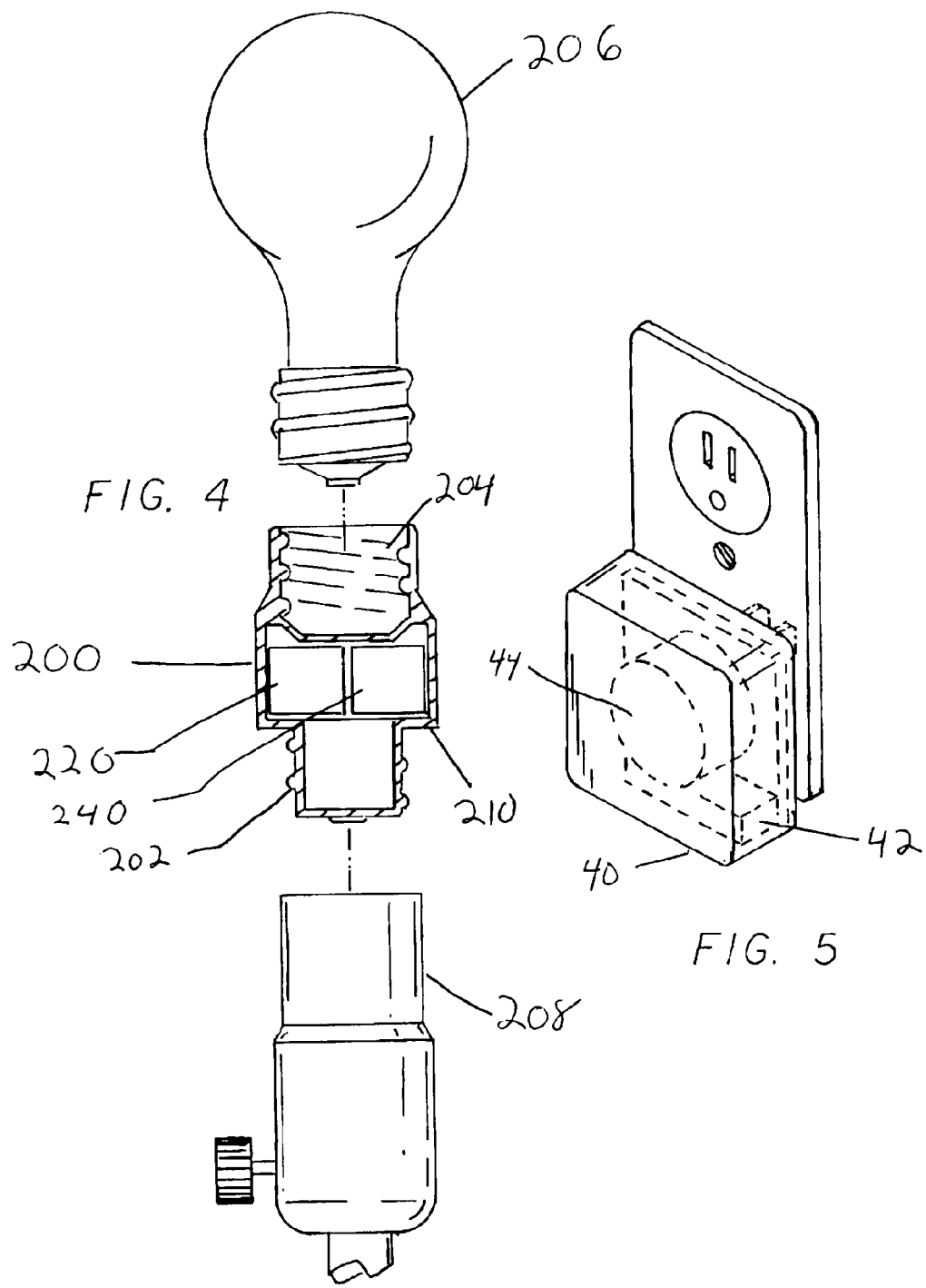
FIG. 4 is an exploded, perspective view of the secondary unit of one embodiment of the present invention adapted to engage a bulb socket.

FIGS. 3 and 4 illustrate secondary units 20, 200 that activate and deactivate appliances according to the signals transmitted by card reader transmitter 16, optional primary unit 40, or secondary units configured as primary controllers 40a, 400a. FIG. 3 illustrates a secondary unit 20 conveniently dimensioned and configured to engage a standard power outlet 26, and comprising housing 31, secondary transceiver 22 electrically connected to secondary controller 24 having male portion 28 and female portion 29, and electrical power outlet 26 serving as a secondary appliance power source. Housing 31 may conveniently fabricated from molded plastic or similar suitable material and may conveniently include screw 33 dimensioned and configured to attach housing 31 to power outlet 26, thereby securing secondary unit 20 such that male portion 28 engages power outlet 26.

Figure 7A:
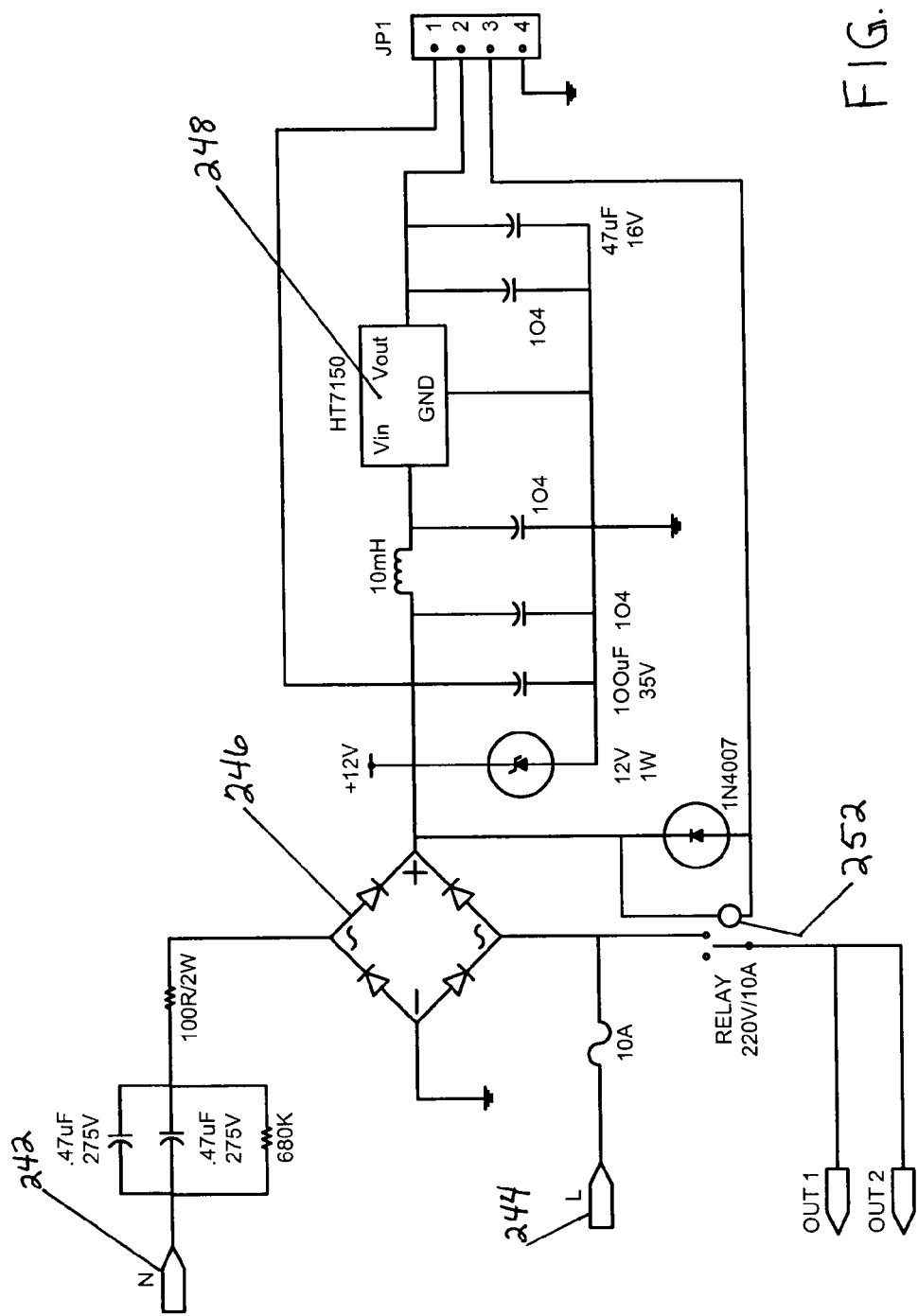
FIGS. 7A and 7B are a schematic representation of a secondary unit for use in a preferred embodiment of the present invention, in which the secondary unit is adapted to engage a wall socket.
Figure 7B:
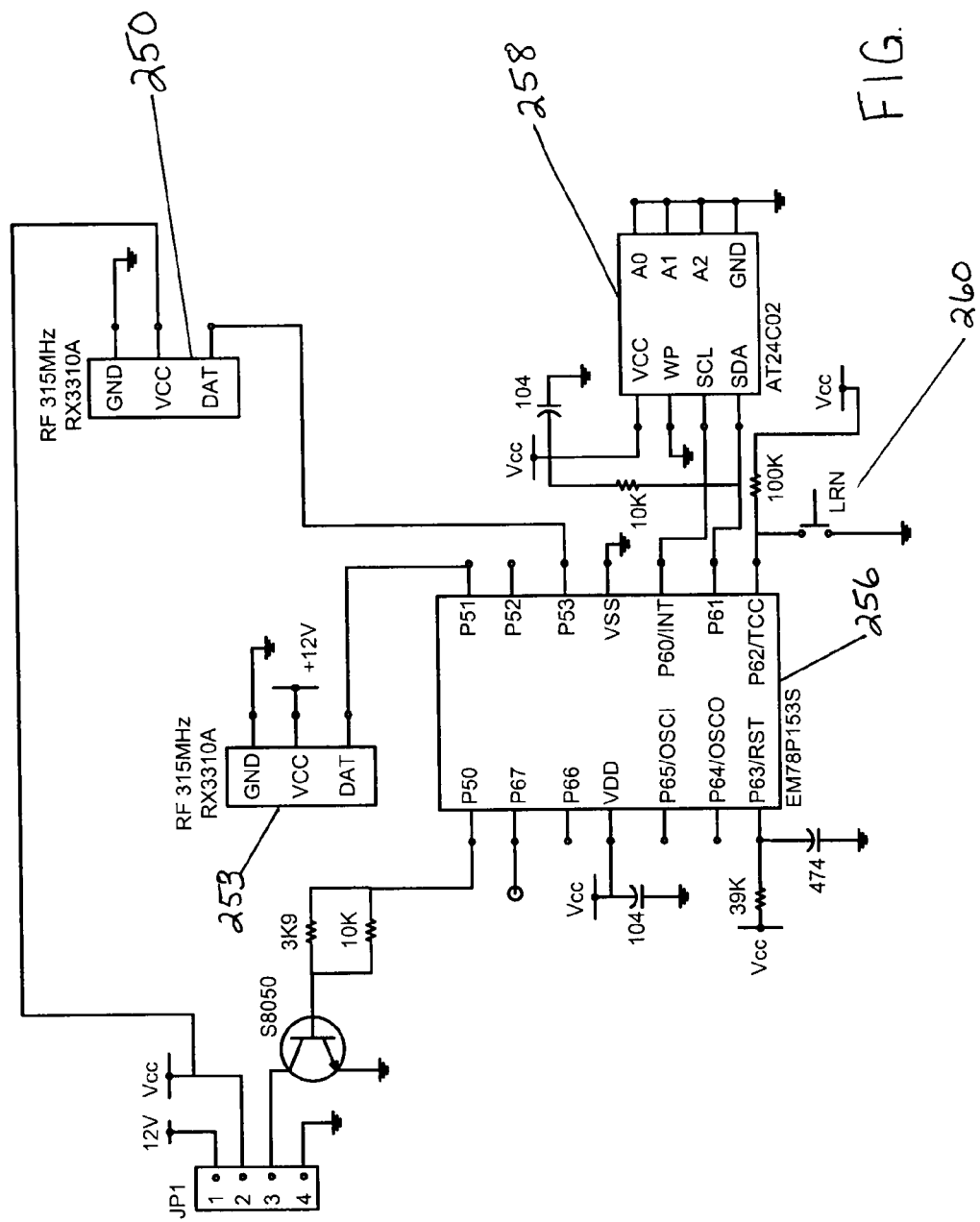

Secondary controller 24 and secondary transceiver 22 may conveniently be formed from one or more electronic circuit boards and components. FIGS. 7a and 7b illustrate a schematic representation of one suitable configuration of secondary controller 24 and secondary transceiver 22. In FIG. 7a, alternating current is received through neutral connection 242 and line connection 244, passes through rectifier 246 and to voltage regulator 248, which may conveniently be a standard HT7150 surface mount voltage regulator. Voltage regulator 248 converts the 12 volt current to a 5 volt current suitable for powering a microcontroller. Relay 252 connects and disconnects the alternating current from the secondary appliance power source to female portion 29, thereby selectively activating and deactivating an appliance. In FIG. 7b, the 12 volt current is connected to secondary transceiver 22, comprising secondary receiver 250 and secondary transmitter 253, each of which may be configured to wirelessly communicate with card reader transmitter 16 through ASK modulation. The 5 volt current from voltage regulator 248 powers microcontroller 256, which may conveniently an 8-bit microcontroller with on-chip memory such as the EM78P1535 from Elan Microelectronics, and electrically erasable programmable read only memory (EEPROM) 258, which may conveniently be an Atmel AT24C02.

The on-chip memory of microcontroller 256 may suitably be programmed to implement the algorithms illustrated in FIGS. 10-13 and which are further described below. Upon secondary receiver 250 receiving a first signal, previously described, microcontroller 256 activates relay 252, which, in turn, connects the secondary appliance power source 34 to a an appliance plugged in to female portion 29. Upon secondary receiver 250 receiving a second signal, previously described, or a fourth signal, described below, microcontroller 256 deactivates relay 252, which, in turn, disconnects the secondary appliance power source 34 from an appliance plugged in to female portion 29. Upon activation of power source 34, microcontroller 256 causes secondary transmitter 253 to transmit a third signal, described below.

As is discussed above, a unique value associated with each card reader 12 is used to ensure card reader 12 does not inadvertently activate and deactivate secondary units 20 and 200, primary unit 40, or secondary units configured to act as primary controllers 40a and 400a in adjacent rooms. Upon activation of learn switch 260, microcontroller 256 awaits receipt of a signal comprising a command code and a unique identifier. Upon receipt of the unique identifier, microcontroller 256 stores the unique identifier in EEPROM 258 which retains the value in a non-volatile fashion. After storage, upon receipt of a first signal or second signal, described above, or a fourth signal, described below, microcontroller 256 retrieves the unique value from EEPROM 258 and compares it to the unique value in said first signal or second signal. If the values match, microcontroller 256 activates or deactivates relay 252 as described above. If the values do not match, microcontroller 256 ignores the signals. As is described above, upon activation of secondary appliance power source 34, microcontroller 256 causes secondary transmitter 254 to transmit a third signal comprising the unique value stored in EEPROM 258 and a command code. In this way, secondary unit 20 or 200 may communicate with an optional primary unit 40 or a secondary unit configured to act as a primary controller 40a or 400a. Upon receiving the third signal, primary unit 40 or secondary unit configured to act as a primary controller 40a or 400a, each described below, will cause primary transceiver 42 to transmit a fourth signal containing the unique value and a command code, thereby causing the activation of relay 252 as is described above. In this manner, should secondary appliance power source 26 be deactivated upon insertion of keycard 10 into card reader 12, secondary unit 20, 200 may communicate with optional primary unit 40 or secondary unit configured to act as primary controller 40a or 400a to determine the if keycard 10 is in place upon activation of secondary appliance power source 26.

FIG. 4 illustrates secondary unit 200 conveniently dimensioned and configured to engage a standard light fixture, and includes housing 210, secondary transceiver 220, secondary controller 240, male portion 202 dimensioned and configured to engage a light socket, female portion 204 dimensioned and configured to receive a light bulb 206 acting as a secondary appliance, and light fixture 208 acting as a secondary appliance power source. Housing 210 may conveniently be fabricated from molded plastic or similar suitable material.

Secondary controller 240 and secondary transceiver 220 are electrically connected and may conveniently be formed from one or more electronic circuit boards and components. FIGS. 8a and 8b illustrate a schematic representation of one suitable configuration of secondary controller 240 and secondary transceiver 220. In FIG. 8a, alternating current is received through neutral connection 212 and line connection 214, passes through rectifier 216 and to voltage regulator 218, which may conveniently be a standard HT7150 surface mount voltage regulator. Rectifier 216 works in conjunction with Zener diode 222 to convert the incoming alternating current a 12 volt direct current, suitable to power secondary transceiver 220. Voltage regulator 218 then converts the 12 volt current to a 5 volt current suitable for powering a microcontroller. Triac 224 connects and disconnects the alternating current from the secondary appliance power source 208 to female potion 204, thereby selectively activating secondary appliance 206. In FIG. 8b, the 12 volt current is connected to secondary transceiver 220, which may conveniently comprise secondary receiver 221 and secondary transmitter 219, each of which may be configured to communicate with card reader transmitter 16 through ASK modulation. Secondary receiver 221 may conveniently be an ASK modulation single chip receiver such as an RX3310A available from HiMARK Tech, Inc. Secondary transmitter 219 may conveniently be an ASK modulation single trip transmitter or may conveniently be formed from discrete components as illustrated. In the preferred embodiment, secondary transmitter 219 is formed of discrete components to reduce the size of secondary unit 200. The 5 volt current from voltage regulator 218 powers microcontroller 226, which may conveniently an 8-bit microcontroller with on-chip memory such as the EM78P1535 from Elan Microelectronics, and electrically erasable programmable read only memory (EEPROM) 228, which may conveniently be an Atmel AT24C02.

The on-chip memory of microcontroller 226 may suitably be programmed to implement the algorithms illustrated in FIGS. 10-13, which are further described below. Upon secondary receiver 221 receiving a first signal, previously described, microcontroller 226 activates triac 224 which, in turn, connects the secondary appliance power source 208 to an appliance 206 received in female portion 204. Upon secondary receiver 221 receiving a second signal, previously described, microcontroller 226 deactivates triac 224 which, in turn, disconnects secondary appliance power source 208 from appliance 206. Upon activation of power source 208, microcontroller 226 causes secondary transmitter 219 to transmit a third signal, described above.

As is discussed above, a unique value associated with card reader 12 is used to ensure card reader 12 does not inadvertently activate and deactivate secondary units 20 and 200 in adjacent rooms. Upon activation of learn switch 230, microcontroller 226 awaits receipt of a signal comprising a command code and a unique identifier. Upon receipt of the unique identifier, microcontroller 226 stores the unique identifier in EEPROM 228 which retains the value in a non-volatile fashion. Thereafter, upon receipt of a signal, microcontroller retrieves the unique value from EEPROM 228 and compares it to the unique value in the signal. If the values match, microcontroller 226 activates or deactivates triac 224 as described above or in accordance with the algorithms illustrated in FIGS. 10-13 as described below. If the values do not match, microcontroller 226 ignores the signals. As is described above, upon activation of secondary appliance power source 208, microcontroller 226 causes secondary transmitter 219 to transmit a third signal comprising the unique value stored in EEPROM 228 and a command code. In this way, secondary unit 200 may communicate with an optional primary unit 40 as is described above, or with a secondary unit configured to act as a primary controller 40a, 400a, described below, or with a card reader configured to act as a primary controller, described below but not illustrated.

Figure 5:
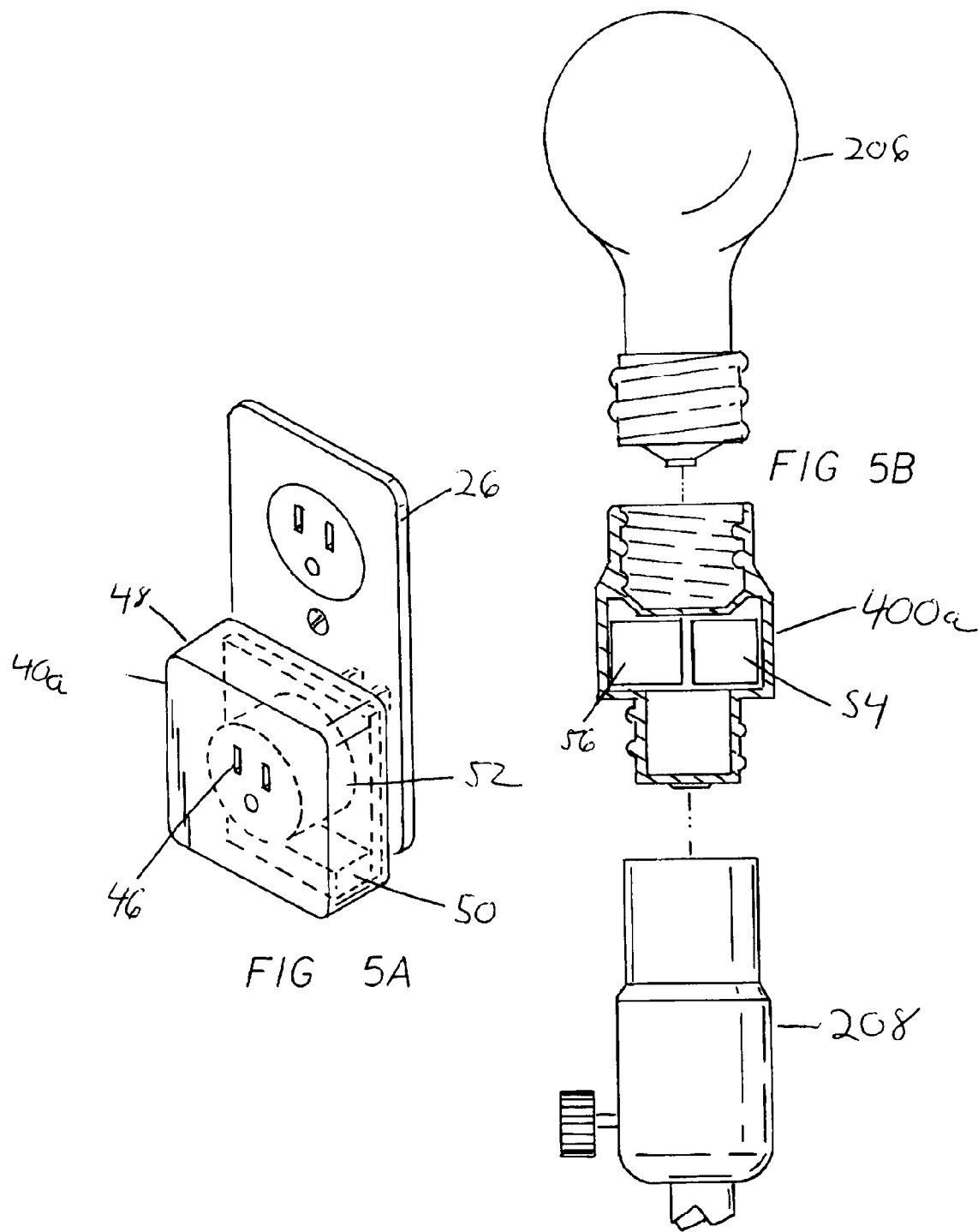
FIG. 5 is a phantom, perspective view of the primary unit of one embodiment of the present invention, with FIGS. 5A and 5B being perspective views of secondary units of two embodiments of the present invention configured to serve as primary controllers.
Figure 9A:
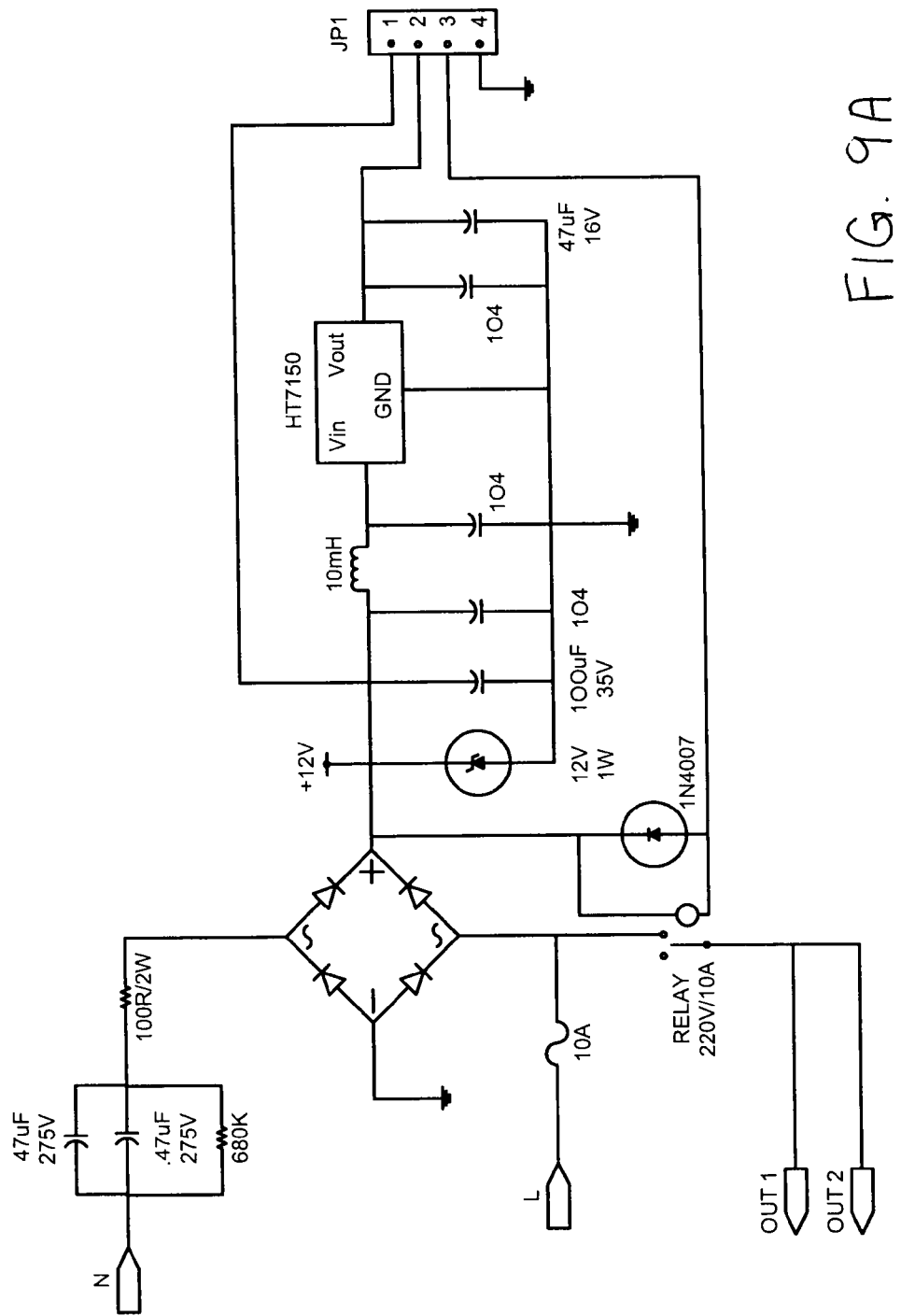
FIGS. 9A and 9B are a schematic representation of a primary control unit for use in a preferred embodiment of the present invention.
Figure 9B:
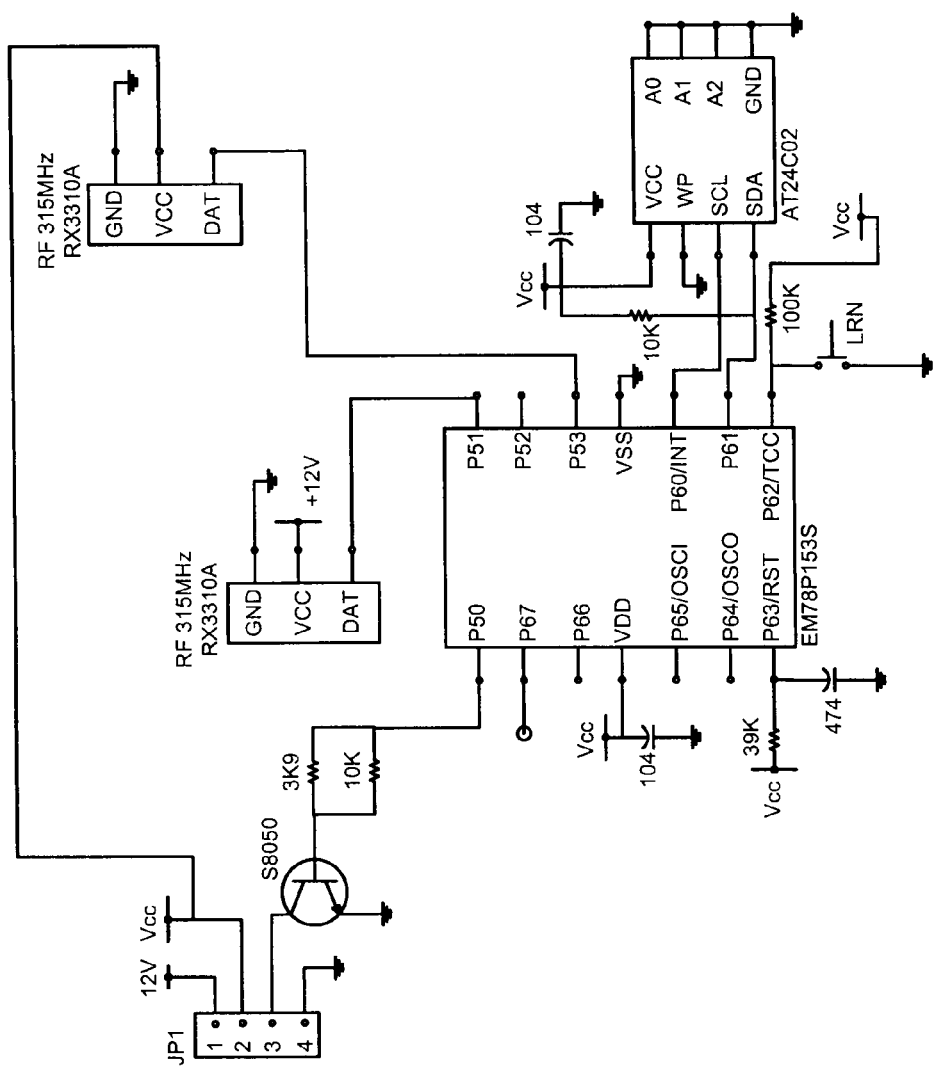

The EMS of the present invention may also include an optional primary unit 40. FIG. 5 illustrates one embodiment of primary unit 40 configured and dimensioned to engage a power outlet serving as a primary unit power source and including primary controller 44 electrically connected to primary transceiver 42 and primary unit power source 26. FIG. 5A illustrates a second embodiment of primary unit 40a in the form of a secondary controller configured to act as a primary controller, also configured and dimensioned to engage a power outlet 26 and further comprising a female portion 46 configured and dimensioned to receive a power plug from a primary appliance and including housing 48, transceiver 50, and primary controller 52. FIG. 5B illustrates a third embodiment of primary unit 400a in the form of a secondary unit configured to act as a primary controller, configured and dimensioned to engage a light fixture 208 and receive a light bulb 206, consisting of primary transceiver 54 and primary controller 56. It will be understood by those of ordinary skill in the art that the components of embodiments 40 and 40a may be identical to the components of secondary unit 20 and that the components of embodiment 400a may be identical to the components of secondary unit 200, the only difference being the programming in microcontroller 226, which is further described below, and the fact that each primary unit or secondary unit configured to act as a primary controller is connected to an unswitched power source. FIGS. 9a and 9b illustrate a schematic representation of embodiment 40a and illustrate components that are identical to those of FIGS. 7a and 7b, and which are fully described above.

In another embodiment of the present invention, card reader 12 may conveniently be configured to act as a primary controller (not illustrated). In such an embodiment, card reader 12 may further comprise a battery-powered card reader transceiver instead of battery-powered card reader transmitter 16. In such an embodiment, the card reader transceiver may conveniently comprise a card reader transmitter substantially identical to card reader transmitter 16 and a card reader receiver substantially identical to secondary unit receiver 221, both of which are described above. In such an embodiment, card reader controller would be configured to implement the algorithm of FIG. 10, which is more fully described below.

It will be understood by those of ordinary skill in the art that secondary controller 24, 240, and primary controller 52, 56 may be further configured to delay the disconnection of secondary appliance power source 26, 208 from an appliance upon receipt of the second signal. Such a delay may be desirable to enable the occupant of the room a brief period of time to collect his or her belongings and then exit the room prior to deactivation of appliances.

Figure 10:
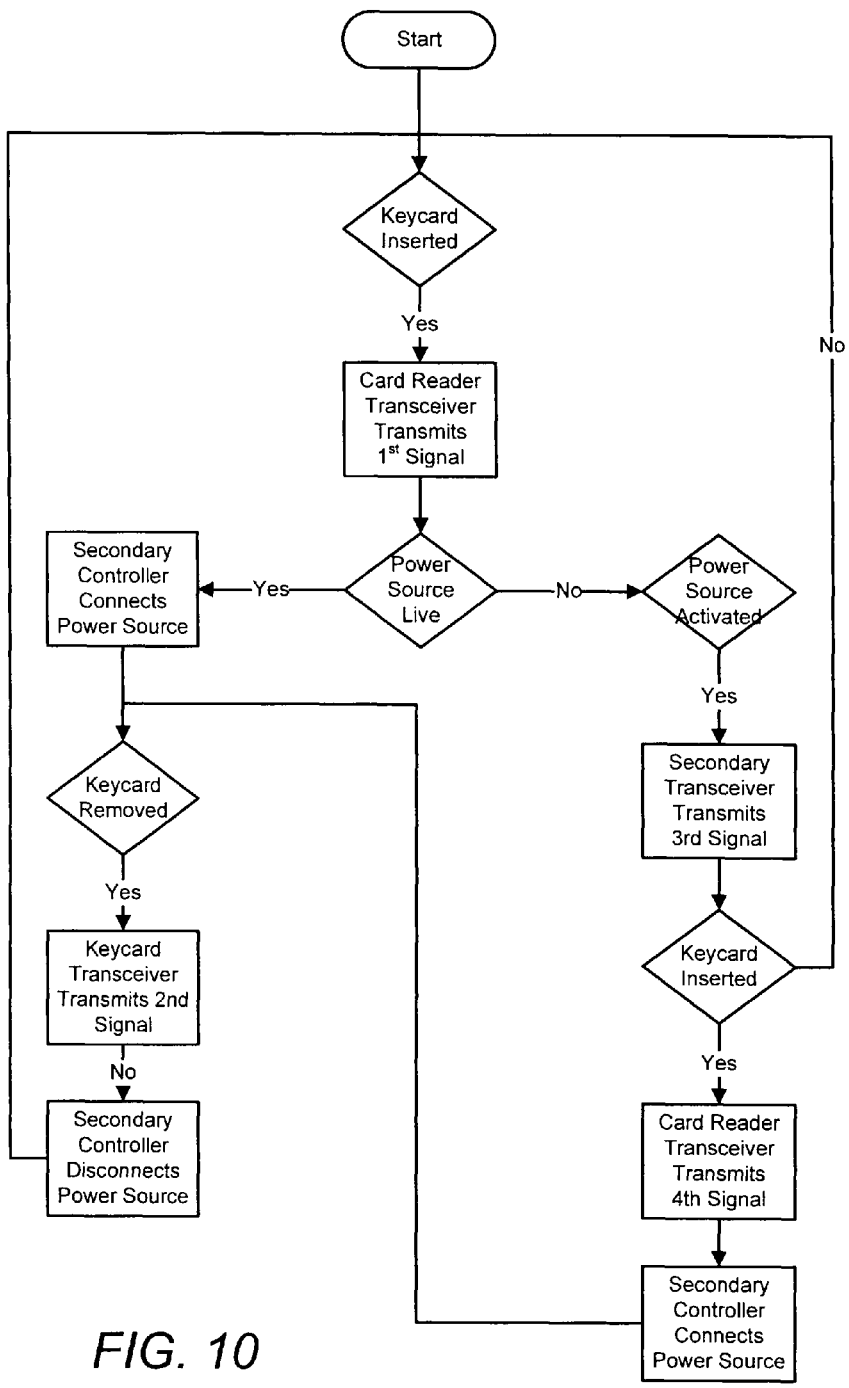
FIG. 10 is a flowchart representation illustrating the communication and operation of one embodiment of the present invention.

FIG. 10 illustrates, in flowchart form, the operation of an embodiment of the present invention in which card reader 12 is configured to act as a primary controller. At the starting point, there is no keycard 10 in card reader 12 and no appliances are activated. Upon insertion of keycard 10 into slot 11 of card reader 12 and consequent activation of switch 14, card reader transceiver transmits a first signal, described above, whereupon differing actions are taken by secondary units 20, 200 with active power sources, and secondary units 20, 200 with inactive power sources. Secondary units 20, 200 with active power sources that are within range of card reader transceiver receive the first signal and connect secondary unit power source 26, 208 to an appliance, thereby activating it as is described above. Substantially upon removal of keycard 10 from card reader 12 and consequent deactivation of switch 14, card reader transceiver transmits a second signal, described above. Secondary units 20, 200 with active power sources that are within range of card reader transceiver, receive the second signal and secondary controller disconnect the power source from the appliance, thereby deactivating it as is described above, and the system returns to the starting point. Returning to the second decision point, secondary units 20, 200 with inactive power sources do not have power to receive the first signal. Accordingly, when the secondary unit power source 208, 26 activates, secondary units 20, 200 transmit a third signal as is described above. Upon receipt of the third signal, card reader transceiver transmits a fourth signal, described above, if switch 14 is activated. Upon receipt of the fourth signal, secondary units 20, 200 activates appliances as is described above. If, upon receipt of the third signal by the card reader transceiver, switch 14 is not activated, no fourth signal is transmitted and secondary units 20, 200 leave secondary appliance power source disconnected.

Figure 11:
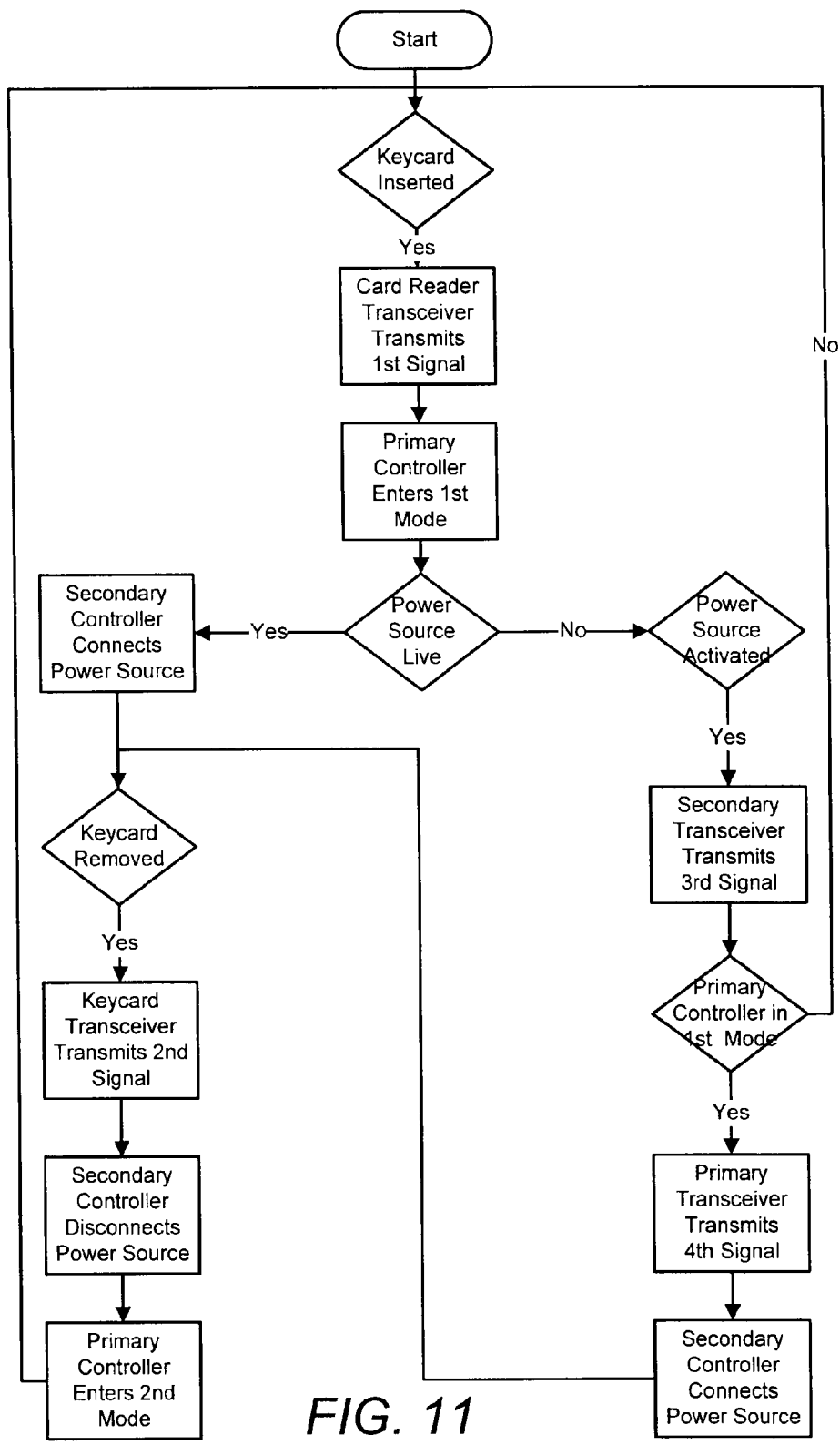
FIG. 11 is a flowchart representation illustrating the communication and operation of a second embodiment of the present invention.

FIG. 11 illustrates, in flowchart form, the operation of embodiments of the present invention including a primary controller 40, or in which one of the secondary units is configured to operate as a primary controller 40a, 400a. At the starting point there is no keycard 10 in card reader 12 and no appliances are activated. Upon insertion of keycard 10 into slot 11 of card reader 12, card reader transmitter 16 transmits a first signal, described above. Upon receipt of the first signal, primary controller 40, or secondary unit configured to act as a primary controller 40a, 400a enter a first mode corresponding to the presence of keycard 10 in card reader 12. If secondary unit configured to act as a primary controller 40a, 400a, is present, secondary unit controller will connect the power source to an appliance as is described above. Differing actions are then taken by secondary units 20, 200 with active power sources, and secondary units 20,200 with inactive power sources. The secondary units with active power sources that are within range of card reader transmitter 16 receive the first signal and connect secondary unit power source 26, 208 to an appliance, thereby activating it, as is described above. Upon removal of keycard 10 from card reader 12, card reader transceiver 16 transmits a second signal, described above. Secondary units 20, 200 with active power sources that are within range of card reader transmitter 16, receive the second signal and secondary controller 24, 240 disconnects secondary unit power source 26, 208 from the appliance, thereby deactivating it, as is described above. Primary unit 40, or secondary unit configured to act as a primary controller 40a, 400a also receive the second signal and enters a second mode corresponding to the lack of a keycard 10 in card reader 12, and the system returns to its starting point. Returning to the second decision point, the secondary units 20, 200 with inactive power sources do not have power to receive the first signal. Accordingly, when secondary unit power source 26, 208 activates, secondary controller 24, 240 causes secondary transmitter 219, 253 to transmit a third signal as is described above. Upon receipt of the third signal, primary unit transceiver 42, or secondary unit configured to act as a primary controller 40a, 400a, transmits a fourth signal, described above, if primary controller 40 or secondary unit configured to act as primary controller 40a, 400a, is in the first mode. Upon receipt of the fourth signal, secondary controller 24, 240 activates the appliance, as is described above. If, upon receipt of the third signal, primary controller 40 or secondary unit configured to act as primary controller 40a, 400a, is in the first mode, no fourth signal is transmitted and secondary controller 24, 240 leaves secondary appliance power source 26,206 disconnected.

Figure 12:
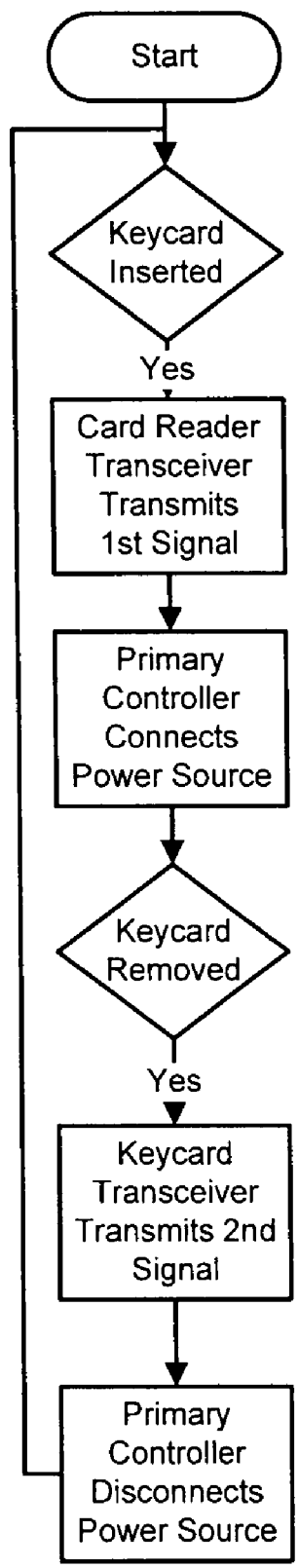
FIG. 12 is a flowchart representation illustrating the communication and operation of a third embodiment of the present invention.

FIG. 12 illustrates, in flowchart form, the operation of an embodiment of the present invention including only card reader 12 and a single secondary controller configured to act as primary controller 40a, 400a. At the starting point there is no keycard 10 in card reader 12 and no appliance is activated. Upon insertion of keycard 10 into slot 11 of card reader 12, card reader transmitter 16 transmits a first signal, described above. Upon receipt of the first signal, secondary unit configured to act as a primary controller 40a, 400a enter a first mode corresponding to the presence of keycard 10 in card reader 12 and causes controller 52,56 to connect primary unit power source 26,208 to an appliance, as is described above. Upon removal of keycard 10 from card reader 12, card reader transceiver 16 transmits a second signal, described above. Secondary unit configured to act as a primary controller 40a, 400a receives the second signal and enter a second mode corresponding to the lack of a keycard 10 in card reader 12 and disconnects the appliance. The system then returns to the starting point.

Figure 13:
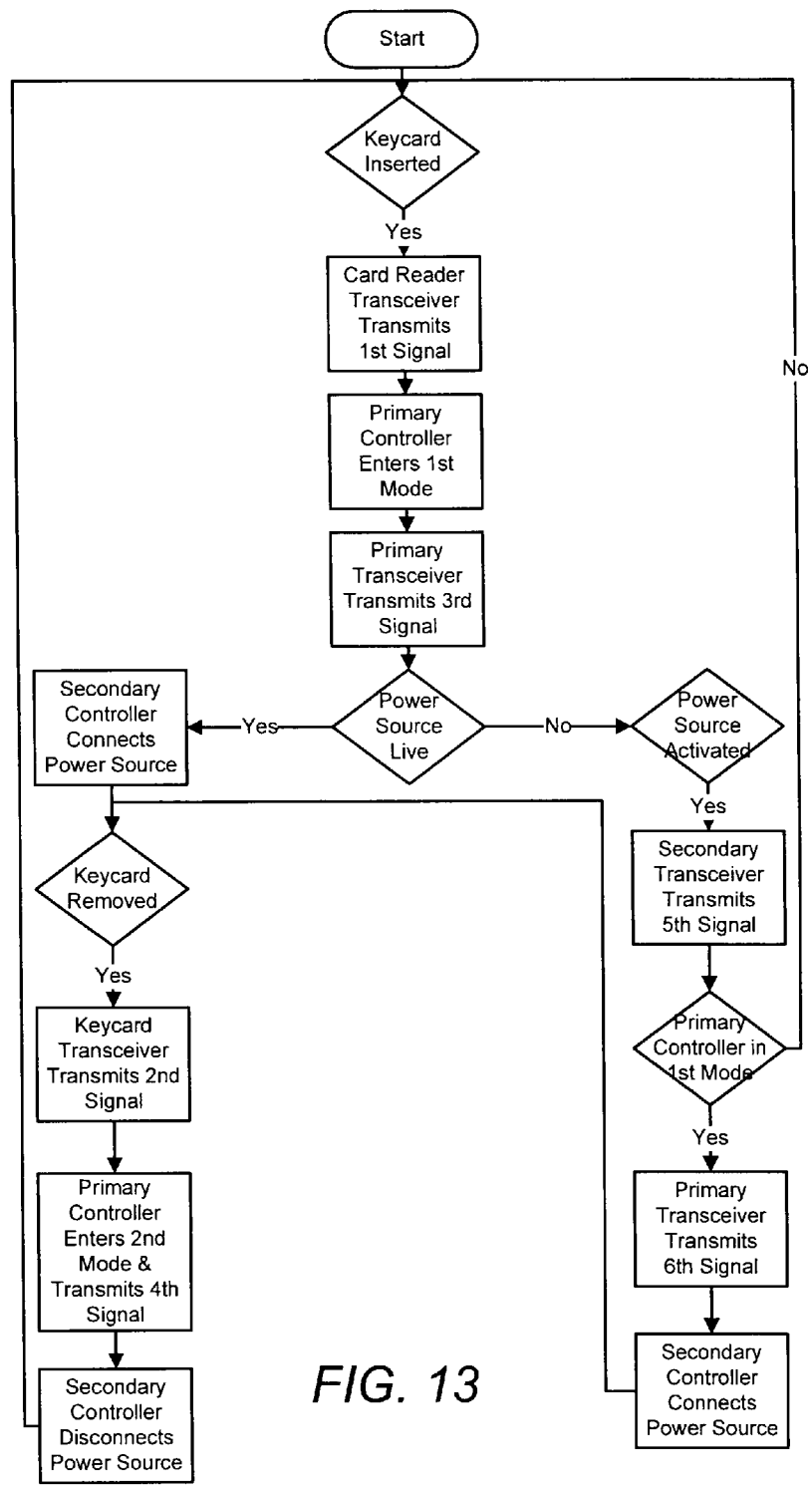
FIG. 13 is a flowchart representation illustrating the communication and operation of a fourth embodiment of the present invention.

FIG. 13 illustrates, in flowchart form, the operation of embodiments of the present invention including a primary controller 40, or in which one of the secondary units is configured to operate as a primary controller 40a, 400a, but in which secondary units 20, 200 do not respond to signals from card reader 12. At the starting point there is no keycard 10 in card reader 12 and no appliance is activated. Upon insertion of keycard 10 into slot 11 of card reader 12, card reader transmitter 16 transmits a first signal, described above. Upon receipt of the first signal, primary controller 40, or secondary unit configured to act as a primary controller 40a, 400a enter a first mode corresponding to the presence of keycard 10 in card reader 12. If secondary unit configured to act as a primary controller 40a, 400a, is present, secondary unit controller 24, 240 will activate the appliance, as is described above. Primary unit 40, or secondary unit configured to act as a primary controller 40a, 400a, will then transmit a third signal. Differing actions are then taken by secondary units 20, 200 with active power sources, and secondary units 20, 200 with inactive power sources. Secondary units with active power sources that are within range of primary unit 40 or secondary unit configured to act as primary controller 40a, 400a receive the third signal and connect secondary unit power source 26,208 to an appliance. Upon removal of keycard 10 from card reader 12, card reader transmitter 16 transmits a second signal, described above. Primary unit 40 or secondary unit configured to act as primary controller 40a, 400a, receive the second signal and enter a second mode corresponding to the lack of keycard 10 in card reader 12. If secondary unit configured to act as primary controller 40a, 400a is used, it will then disconnect secondary unit power source 26, 208 and transmit a fourth signal as described above. Secondary units 20, 200 with active power sources that are within range receive the fourth signal and secondary controller 24, 240 disconnects secondary unit power source 26, 208 from the appliance, as is described above. Returning to the second decision point, secondary units 20, 200 with inactive power sources do not have power to receive the third signal. Accordingly, when secondary unit power source 26, 208 activates, secondary controller 24, 240 causes secondary transmitter 219, 253 to transmit a fifth signal as is described above. Upon receipt of the fifth signal, primary unit 40, or secondary unit configured to act as a primary controller 40a, 400a, transmits a sixth signal, described above, if primary controller 40 or secondary unit configured to act as primary controller 40a, 400a, is in the first mode. Upon receipt of the sixth signal, secondary controller 24, 240 activates the appliance, as is described above. If, upon receipt of the fifth signal by primary controller 40, or secondary unit configured to act as primary controller 40a, 400a, is in the second mode, no sixth signal is transmitted and secondary controller 24, 240 leaves secondary appliance power source 26, 208 disconnected.

Equivalent elements, components, and materials can be substituted for the elements employed in this invention to obtain substantially the same results in substantially the same way. Additionally, while the foregoing describes a preferred embodiment of the system and apparatus of this invention, it is understood that such description is illustrative only of the principles of this invention and is not to be considered limitative thereof. Because numerous variations and modifications of the present invention will readily occur to those skilled in the art, the scope of this invention is to be limited solely by the claims appended hereto.

What is claimed is:

1. An apparatus for reducing energy consumption within an unoccupied room comprising:
    a keycard;
    a card reader inside said room dimensioned and configured to receive said keycard and comprising a switch positioned, dimensioned, and configured to be activated substantially upon insertion of said keycard into said card reader and to be deactivated substantially upon removal of said keycard from said card reader;
    a battery-powered card reader transceiver configured to wirelessly transmit a first signal and a second signal;
    a card reader controller electrically connected to said switch and said card reader transceiver; and
    at least one secondary unit comprising
        a secondary transceiver configured to wirelessly communicate with said card reader transceiver,
        a secondary controller electrically connected to said secondary transceiver, and
        a secondary appliance power source electrically connected to said secondary controller;
    said card reader controller being configured to cause said card reader transceiver to wirelessly transmit said first signal upon activation of said switch and to transmit said second signal upon deactivation of said switch;
    said secondary controller being configured to connect said secondary appliance power source to an appliance substantially upon said secondary transceiver receiving said first signal; and
    said secondary controller being further configured to disconnect said secondary appliance power source from said appliance substantially upon said secondary transceiver receiving said second signal and
    said secondary controller being further configured to cause said secondary transceiver to wirelessly transmit a third signal upon activation of said secondary appliance power source;
    said card reader controller being further configured to cause said card reader transceiver to transmit a fourth signal if said switch is activated when said card reader transceiver receives said third signal; and
    said secondary controller being further configured to connect said secondary appliance power source to said appliance substantially upon said secondary transceiver receiving said fourth signal.

2. The apparatus of claim 1 wherein said secondary controller is configured to delay said disconnection of said secondary appliance power source from said appliance for a predetermined period of time.

3. The apparatus of claim 1 wherein said secondary unit further comprises a male portion and a female portion, said male portion being configured to receive electrical current from said secondary appliance power source and said female portion being configured to transmit electrical current to said appliance.

4. The apparatus of claim 3 wherein,
    said male portion is dimensioned and configured to engage a light fixture and
    said female portion is dimensioned and configured to receive a light bulb.

5. The apparatus of claim 3 wherein
    said male portion is dimensioned and configured to engage a power outlet and
    said female portion is dimensioned and configured to receive a power plug.

6. An apparatus for reducing energy consumption within an unoccupied room comprising:
    a keycard;
    a card reader inside said room dimensioned and configured to receive said keycard and comprising a switch positioned, dimensioned, and configured to be activated substantially upon the insertion of said keycard into said card reader and to be deactivated substantially upon removal of said keycard from said card reader;
    a battery-powered card reader transmitter configured to wirelessly transmit a first signal and a second signal;
    a card reader controller electrically connected to said switch and said card reader transmitter;
    a primary unit comprising
        a primary transceiver configured to wirelessly receive signals from said card reader transmitter,
        a primary unit power source;
        a primary controller electrically connected to said primary transceiver and said primary unit power source; and
    at least one secondary unit comprising:
        a secondary transceiver configured to wirelessly communicate with said primary transceiver and to receive signals from said card reader transmitter,
        a secondary controller electrically connected to said secondary transceiver, and
        a secondary appliance power source electrically connected to said secondary controller;
    said card reader controller being configured to cause said card reader transmitter to wirelessly transmit said first signal substantially upon activation of said switch and to transmit said second signal substantially upon deactivation of said switch;
    said primary controller being configured to enter a first mode substantially upon said primary transceiver receiving said first signal and to enter a second mode substantially upon said primary transceiver receiving said second signal;

said secondary controller being configured to connect said secondary appliance power source to a secondary appliance substantially upon said secondary transceiver receiving said first signal; and said secondary controller being further configured to disconnect said secondary appliance power source from said secondary appliance substantially upon said secondary transceiver receiving said second signal;

said secondary controller being further configured to cause said secondary transceiver to transmit a third signal upon activation of said secondary appliance power source;

said primary controller being further configured to cause said primary transceiver to transmit a fourth signal if said primary controller is in said first mode when said primary transceiver receives said third signal; and said secondary controller being further configured to connect said secondary appliance power source to said secondary appliance substantially upon said secondary transceiver receiving said fourth signal.

7. The apparatus of claim 6 wherein said primary unit is further configured to connect said primary unit power source to a primary appliance substantially upon said primary transceiver receiving said first signal; and said primary controller is further configured to disconnect said primary unit power source from said primary appliance substantially upon said primary transceiver receiving said second signal.

8. The apparatus of claim 6 wherein said secondary controller is configured to delay said disconnection of said secondary appliance power source from said secondary appliance for a predetermined period of time.

9. The apparatus of claim 6 wherein said secondary unit further comprises a male portion and a female portion, said male portion being configured to receive electrical current from said secondary appliance power source and said female portion being configured to transmit electrical current to said secondary appliance.

10. The apparatus of claim 9 wherein said male portion is dimensioned and configured to engage a power outlet and said female portion is dimensioned and configured to receive a power plug.

11. The apparatus of claim 9 wherein said male portion is dimensioned and configured to engage a light fixture and said female portion is dimensioned and configured to receive a light bulb.

12. An apparatus for reducing energy consumption within an unoccupied room comprising:

a keycard;

a card reader inside said room dimensioned and configured to receive said keycard and comprising a switch positioned, dimensioned, and configured to be activated substantially upon the insertion of said keycard into said card reader and to be deactivated substantially upon removal of said keycard from said card reader;

a battery-powered card reader transmitter configured to wirelessly transmit a first signal and a second signal;

a card reader controller electrically connected to said switch and said card reader transmitter;

a primary unit comprising
 a primary transceiver configured to wirelessly receive signals from said card reader transmitter, and
 a primary controller electrically connected to said primary transceiver; and at least one secondary unit comprising:
 a secondary transceiver configured to wirelessly communicate with said primary transceiver,
 a secondary controller electrically connected to said secondary transceiver, and
 a secondary appliance power source electrically connected to said secondary controller;

said card reader controller being configured to cause said card reader transmitter to wirelessly transmit said first signal substantially upon activation of said switch and to transmit said second signal substantially upon deactivation of said switch;

said primary controller being configured to enter a first mode upon receipt of said first signal and to enter a second mode upon receipt of said second signal;

said primary controller being further configured to cause said primary transceiver to transmit a third signal substantially upon entering said first mode and to transmit a fourth signal substantially upon entering said second mode;

said secondary controller being configured to connect said secondary appliance power source to a secondary appliance substantially upon said secondary transceiver receiving said third signal; and said secondary controller being further configured to disconnect said secondary appliance power source from said secondary appliance substantially upon said secondary transceiver receiving said fourth signal.

13. The apparatus of claim 12 wherein said secondary controller is further configured to cause said secondary transceiver to transmit a fifth signal upon activation of said secondary appliance power source;

said primary controller is further configured to cause said primary transceiver to transmit a sixth signal if said primary controller is in said first mode when said primary transceiver receives said fifth signal; and said secondary controller being further configured to connect said secondary appliance power source to said secondary appliance substantially upon said secondary transceiver receiving said sixth signal.

14. The apparatus of claim 12 wherein said primary unit further comprises a primary appliance power source and said primary controller is further configured to connect said primary appliance power source to a primary appliance substantially upon entry of said first mode and to disconnect said primary appliance power source from said primary appliance substantially upon entry of said second mode.

15. The apparatus of claim 12 wherein said secondary controller is configured to delay said disconnection of said secondary appliance power source from said secondary appliance for a predetermined period of time.

16. The apparatus of claim 12 wherein said secondary unit further comprises a male portion and a female portion, said male portion being configured to receive electrical current from said secondary appliance power source and said female portion being configured to transmit electrical current to said secondary appliance.

17. The apparatus of claim 16 wherein said male portion is dimensioned and configured to engage a power outlet and said female portion is dimensioned and configured to receive a power plug.

18. The apparatus of claim 16 wherein said male portion is dimensioned and configured to engage a light fixture and said female portion is dimensioned and configured to receive a light bulb.

19. The apparatus of claim 14 wherein said primary unit further comprises a male portion dimensioned and configured to engage a power outlet and a female portion dimensioned and configured to receive a power plug.

* * * * *